United States Patent [19]

Bak

[11] Patent Number: 5,052,174

[45] Date of Patent: Oct. 1, 1991

[54] CONTINUOUS FLOW FUEL CONTROL SYSTEM

[75] Inventor: Michael J. Bak, Union Lake, Mich.

[73] Assignee: Williams International Corporation, Walled Lake, Mich.

[21] Appl. No.: 389,770

[22] Filed: Aug. 4, 1989

Related U.S. Application Data

[63] Continuation-in-part of Ser. No. 225,193, Jul. 28, 1988, abandoned.

[51] Int. Cl.$^5$ .............................................. F02C 9/28
[52] U.S. Cl. ............................ 60/39.281; 251/129.05
[58] Field of Search ................... 60/39.281, 740, 741; 251/129.05

[56] References Cited

U.S. PATENT DOCUMENTS

| | | | |
|---|---|---|---|
| 3,523,676 | 8/1970 | Barker | 251/129.05 |
| 3,882,675 | 5/1975 | Galmiche et al. | 60/39.281 |
| 4,015,426 | 4/1977 | Hobo et al. | 60/39.281 |
| 4,454,713 | 6/1984 | Meyer et al. | 60/39.281 |
| 4,573,115 | 2/1986 | Halgrimson | 364/138 |
| 4,587,805 | 5/1986 | Winch et al. | 60/234 |

Primary Examiner—Louis J. Casaregola
Attorney, Agent, or Firm—Lyon & Delevie

[57] ABSTRACT

A fuel control system for providing steady state fuel flow to a gas-turbine engine comprises a pulse-width modulated, solenoid-operated fuel metering valve, an engine speed transducer, and a remote microprocessor communicating with the valve and the speed transducer through an optical fiber. The valve is operated by a direct current signal which is pulsed at a frequency substantially higher than the natural frequency of the valve spring/plunger system, whereby the plunger remains axially displaced from the valve seat to provide continuous flow through the valve. The amount of axial plunger displacement and, hence, the fuel flow rate are prescribed by the pulse width of the signal directed through the valve.

4 Claims, 1 Drawing Sheet

CONTINUOUS FLOW FUEL CONTROL SYSTEM

CROSS REFERENCE TO RELATED APPLICATIONS

The instant application is a continuation-in-part of U.S. patent application Ser. No. 07/225,193, filed July 28, 1988, entitled "Fuel Control System", assigned to the assignee of the instant application, and now abandoned.

BACKGROUND OF THE INVENTION

The instant invention relates to a fuel control system providing steady state fuel flow to a gas turbine engine of a guided missile in direct proportion to engine fuel requirements. The system uses a pulse-width modulated, solenoid-operated fuel metering valve to provide a substantially linear fuel flow rate in response to control signals derived from engine parameters and communicated from a remote processor via fiber optic link.

The prior art teaches the use of solenoid-operated valves wherein fluid flow through the valve is regulated by means of a magnetic plunger which is normally mechanically biased to seat in a valve body orifice and which is cyclically unseated therefrom by energizing a solenoid coil wrapped around the valve body. The resulting pulsating flow creates difficulties, in the form of stall or flameout, when used for supplying fuel to a gas turbine engine requiring a continuous supply of fuel. In U.S. Pat. No. 4,015,426, Hobo attempts to mitigate the fuel flow discontinuities inherent to fuel systems employing such known pulsed solenoid-operated valves by supplying thereto pulsed control signals having a constant frequency but with a variable pulse width. However, the modification of the pulses as taught in Hobo does not, in and of itself, provide for continuous fuel flow, as the valve taught therein continues to operate in a pulsating manner; rather Hobo relies on the external mechanical damping provided by a elastic fuel line acting as a hydraulic accumulator in order to smooth the flow of fuel to the engine. Hobo further teaches the use of a second valve, 180 degrees out-of-phase with the first valve, to double the effective frequency of the fuel pulse to further mitigate fuel flow discontinuity. The use of multiple valves and external damping means nonetheless remain impractical given the space and cost constraints imposed by a guided missile system application.

U.S. Pat. No. 3,523,676 to Barker teaches a fluid control valve wherein a solenoid-operated plunger is offset from the central axis of the valve so as to induce radial vibration when the plunger is cycled into contact with the valve seat. Such radial vibration is used to reduce the undesirable axial rebound inherent in valves which operate in the aforementioned cyclical fashion, whereby greater fuel flow accuracy is obtained. However, the reduction of axial rebound of the plunger correspondingly further defines each fuel pulse generated by the cyclically-operating valve, thereby increasing the fuel flow discontinuities experienced by the engine.

Moreover, the Barker valve contemplates application in a stationary environment, such as a chemical processing plant, where the corrective vibratory action induced by the eccentric plunger is not defeated by external vibratory sources. Thus, the Barker valve would not be effective in an environment which itself is subject to severe vibratory action, such as within a launched missile.

Thus, in short, systems known to the prior art incorporating solenoid based metering valves deliver fuel in a pulsating fashion and require external damping and/or internal vibratory control to stabilize fuel flow to an engine. Systems of this sort are impractical for use in sensitive fuel control applications such as that required for guided missiles in which space and cost considerations, as well as reliability of operation, are critical factors.

SUMMARY OF THE INVENTION

It is an object of the instant invention to provide a fuel control system for a gas turbine-powered guided missile, the control of which may be accomplished remotely.

Another object of the instant invention is to provide a fuel control system for a guided missile which employs a solenoid-operated valve to meter fuel in a proportional, steady state fashion to the engine thereof, as determined by operating parameters.

The fuel control system of the instant invention for metering fuel to the engine of a guided missile comprises a fuel metering valve on the missile having a tubular valve body, the interior surface of which defines a passage extending therethrough, and a magnetic plunger located within the passage. The interior surface of the valve body is provided with a radially-tapered portion defining the valve seat. The plunger is also provided with a radially-tapered end portion to facilitate fluid-tight engagement between the plunger and the valve seat. A valve spring mechanically biases the plunger towards the valve seat while an O-ring seated into an annular groove in the valve seat ensures the formation of a seal between the plunger and the valve seat when the plunger is maximally biased thereagainst.

A solenoid coil is wrapped around the valve body which, when energized by a constant frequency pulsed direct current signal, produces a biasing magnetic field which axially displaces the plunger to allow fuel flow. The width of the signal pulses prescribes the axial displacement of the plunger relative to the valve seat and, hence, the instantaneous rate of fuel flow through the valve. Significantly, the frequency at which the signal pulses are directed through the solenoid coil is substantially higher than the natural frequency of the valve spring/plunger assembly, whereby a dynamic equilibrium is achieved within the valve so as to maintain the plunger in a substantially fixed position within the passage away from the valve seat. Started another way, the mechanical biasing provided by the spring in combination with the inertia of the plunger act to mechanically rectify the effect of the pulsating magnetic field generated by the solenoid coil. As a result, the valve operates in a manner similar to a servomechanism, with the plunger being displaced to and maintained in a position corresponding to the average power input represented by the signal pulses directed therethrough, whereby continuous fuel flow is achieved. The instant fuel control system thus obviates the need for the vibratory control and external damping required in prior art systems.

Preferably, the optimal instantaneous pulse width is determined from engine parameters in a closed loop control system. In the preferred embodiment, a microprocessor generates the fuel flow commands which define the signal pulses to be directed through the solenoid coil while receiving critical operating data, such as engine speed, from one or more sensors on the missile to provide immediate corrective action. For example, where a speed sensor is employed to monitor the rotational speed of the engine, the microprocessor compares the output from the speed transducer with a speed set point and accordingly adjusts the width of the signal pulses directed through the solenoid coil. Instantaneous airframe speed and altitude, for example, may also be supplied to the microprocessor for use in adjusting the width of the signal pulsed directed through the solenoid coil.

The preferred embodiment of the instant invention further provides for the remote positioning of the microprocessor relative to the missile, thereby obviating the need for providing an expendable microprocessor for each missile. Specifically, the ground-based microprocessor communicates with the missile-based speed transducer and solenoid coil via a fiber optic cable. The fiber optic link enables the transmission of the high frequency signal pulses required for controlling fuel delivery to the high-speed gas turbine engines utilized in guided missiles.

DETAILED DESCRIPTION OF THE PREFERRED EMBODIMENT OF THE INVENTION

Figure 1:
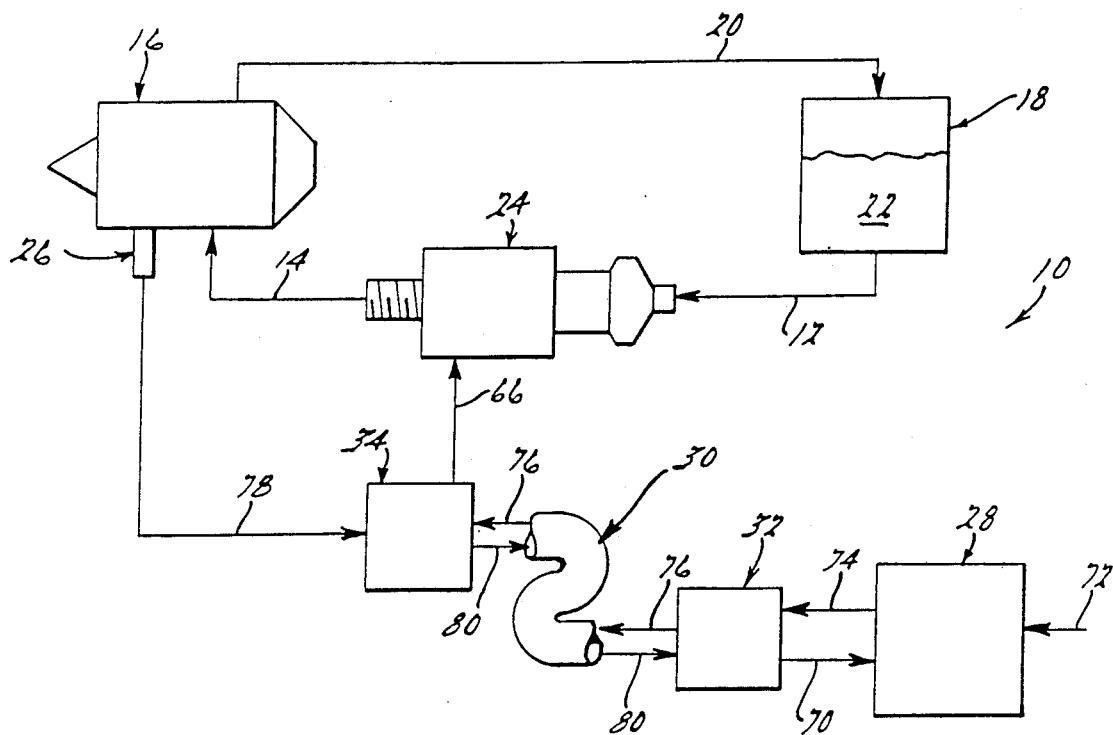
FIG. 1 is a diagrammatic schematic of a proportional flow fuel control system for a guided missile featuring remote processor control in accordance with the instant invention.

Referring to FIG. 1, an exemplary fuel control system 10 constructed in accordance with the instant invention regulates the flow of fuel 22 from a fuel tank 18 through fuel lines 12 and 14 to a gas turbine engine 16 providing propulsion for a guided missile (not shown). The fuel tank 18 is held at constant pressure by compressor bleed air 20 from the engine 16 to assist fuel flow through the fuel lines 12 and 14 and a fuel metering valve 24. A speed transducer 26 generates an output 78 proportional to the rotational speed of the engine 16. The output 78 of the speed transducer 26 is communicated to a ground-based microprocessor 28 via an optical fiber 30 and two signal converters 32 and 34. The microprocessor 28 compares the output of the speed transducer 26 to a set point 72 provided by a missile operator and generates a fuel flow command 74 which, subsequent to conversion by signal converters 32 and 34, comprises a pulse-width modulated direct current signal 66 for use in controlling the valve 24, as described more fully below. In this manner, the speed transducer 26 provides feedback information to the microprocessor 28 regarding engine speed to facilitate precise control thereof.

Figure 2:
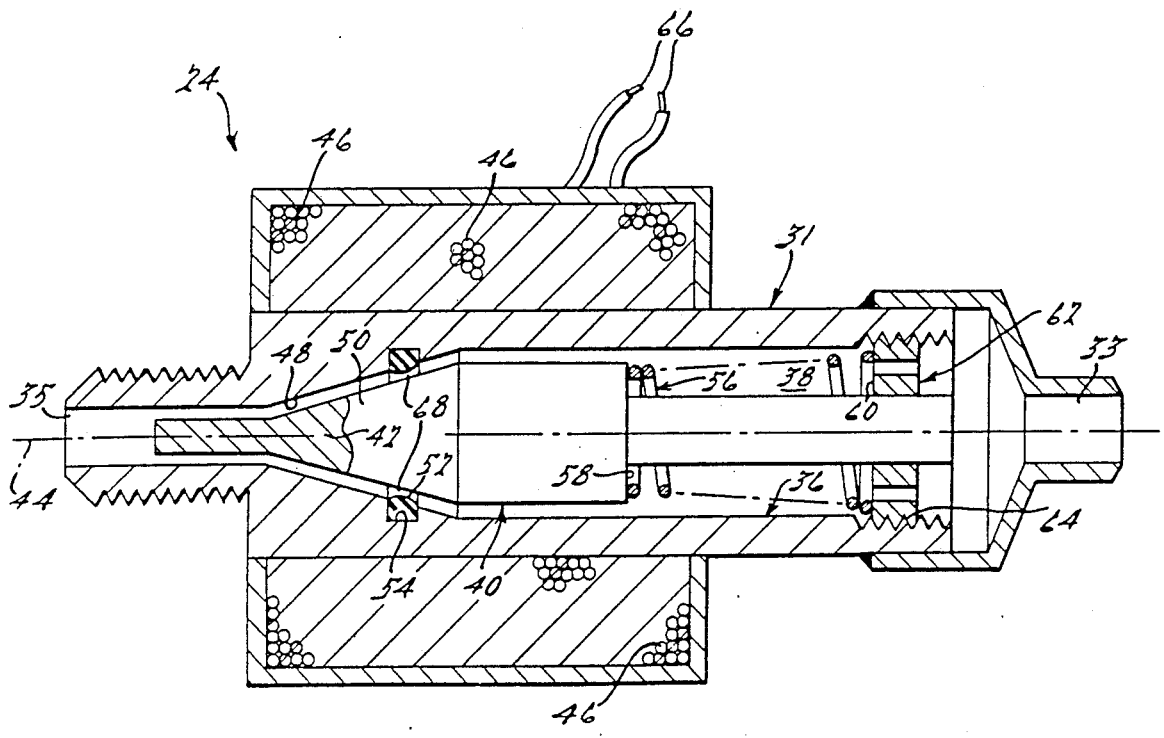
FIG. 2 is an enlarged cross-sectional view of the fuel metering valve of the fuel control system shown in FIG. 1.

More specifically, FIG. 2 shows the fuel metering valve 24 of the instant fuel control system 10 as having a tubular valve body 31 with an input port 33 at one end thereof communicating with the fuel tank 18 via fuel line 12 and an output port 35 at the other end thereof communicating with the engine 16 via fuel line 14. The interior surface 36 of the valve body 31 defines a passage 38 extending therethrough in the direction of fuel flow.

A plunger 40 with a magnetic core 42 is located within the valve passage 38. The magnetic core 42 acts as a solenoid core 42, with the plunger 40 moving along the central axis 44 of the valve body 31. A solenoid coil 46 is wrapped around the valve body 31 so as to be concentric with the passage 38 therein.

The interior surface 36 of the valve body 31 has a radially-tapered portion 48 defining the valve seat. The plunger 40 has a radially-tapered end portion 50 to facilitate fluid-tight engagement of the plunger 40 with the valve seat 48. An O-ring 52 is seated into an annular groove 54 in the valve seat 48 to further ensure a seal between the plunger 50 and valve seat 48 when the plunger 40 is mechanically biased thereagainst by a spring 56 engaging with a surface 58 of the plunger 40 and a surface 60 of a cap 62. The cap 62 has threads 64 which allow for the spring 56 to be pre-loaded when the cap 62 is screwed tight.

The plunger 40 is electromagnetically biased away from the valve seat 48 by the interaction of a magnetic field with the magnetic core 42 of the plunger 40. The biasing magnetic field is generated when the solenoid coil 46 is energized by the pulse-width modulated signal 66 generated by the microprocessor 28. Preferably, the rise time of the magnetic pulse generated by the solenoid coil 46 is long in comparison to the inertia of the plunger 40. A pulse frequency is also selected which is substantially higher than the natural frequency of the plunger/valve spring assembly so as to minimize plunger 40 travel when the solenoid coil 46 is energized by pulses of a varying width, thus simulating a servo-mechanism response from the valve in which plunger 40 is opened to a position corresponding to the average power input represented by the pulses. A steady state condition is achieved wherein the plunger 40 vibrates slightly about the point of average power as related to signal pulse width. The pulse width is selected in proportion to desired engine speed and thus fuel requirements. Wider pulses cause the plunger 40 to become further axially displaced from the valve seat 48, thereby allowing more fuel 22 to flow through the gap 68 between the O-ring 52 and plunger 40 and causing a greater engine speed. Similarly, narrow pulses generate reduced fuel flow and, hence, a lesser engine speed.

As noted hereinabove, the microprocessor 28 regulates fuel flow through the valve 24 by generating a fuel flow command 74 which, subsequent to conversion by signal converters 32 and 34, provides a pulse-width modulated direct current signal 66 for energizing the solenoid coil 46 of the valve 24. Under the instant invention, the microprocessor 28 may be located on the missile or remotely. In the preferred embodiment illustrated in FIG. 1, a ground-based microprocessor 28 communicates with the missile-based speed transducer 26 and solenoid coil 46 via the optical fiber 30 extending between the microprocessor 28 and the missile. Specifically, the digital fuel flow commands 74 generated by the microprocessor 28 in response to engine speed feedback 78 from the speed transducer 26, as well as inputs 72 from the ground-based missile operator, are encoded to a digital word and transmitted through the fiber optic cable 30 as an optical signal 76 by signal converter 32, and then detected and decoded in the missile to provide the pulse-width modulated signal 66 for operating the valve 24. Engine speed feedback 78 from the speed transducer 26 on the missile's engine 16 is likewise digitally encoded and transmitted in the opposite direction through the fiber optic cable 30 as an optical signal 80 by signal converter 34, and then detected and decoded by ground-based signal converter 32 for use by the microprocessor 28.

The simultaneous transmission of data in both directions through the fiber optic cable 30 is achieved by using encoders and decoders within each signal converter 32 and 34 capable of operating on two distinct wavelengths. Thus, for example, the output 78 from the speed transducer 26 is converted to a green light by signal converter 34 for transmission through the fiber 30 for ultimate use by the microprocessor 28, and the fuel flow commands 76 generated by the microprocessor 28 are transmitted through the fiber 30 to the missile as yellow light for ultimate use by the valve 24. The specific wavelengths employed for optical signals 76 and 80 are selected so as to minimize signal attenuation in the fiber optic cable 30, in the manner known to one skilled in the art.

The fiber optic link allows for the transmission of the fuel flow commands from the ground-based processor to the missile at the high frequency and with the accuracy required for optimum performance. In the preferred embodiment, the digital words generated by the microprocessor 28 are transmitted through the fiber optic cable 30 at a frequency of between 60 to 100 Hz to control engine speed within a ±3 percent speed tolerance bandwidth. It will be readily appreciated, however, that higher transmission rates are possible to more tightly regulate engine speed, due to the broad bandwidth of the fiber optic cable 30.

The instant invention permits the repeated use of microprocessor 28 which is part of computer facilities (not shown) at a remote location, thereby providing a cost savings over missiles having an on-board fuel control microprocessor which is lost on any missile flight. It is further noted that the output port 35 of the valve 24 of the instant fuel control system 10 may be directly connected to the engine 16, i.e., without the aid of fuel-pulse dampening hoses, due to the continuous fuel flow provided thereby.

While the preferred embodiment of the invention has been disclosed, it should be appreciated that the invention is susceptible of modification without departing from the spirit of the invention or the scope of the subjoined claims. For example, the pulse-width modulated valve 24 on-board the missile may be replaced by a rotary valve operated by a proportional rotary solenoid or a variable-speed pump. The solenoid-operated rotary valve or variable speed pump on-board the missile is controlled by the remote processor 28 by using a pulse-width modulated signal as described hereinabove or a variable voltage DC source. The instant invention also contemplates the use of a variable-opening rotary valve operated by a stepper motor under remote processor control to precisely and continuously meter fuel to the missile's engine.

I claim:

1. A fuel control system for regulating fuel flow to an engine comprising
    a fuel tank;
    a fuel metering valve comprising
        a tubular valve body with an input port at one end and a tapered output port at an opposite end;
        a magnetic plunger axially aligned with the central axis of said valve body, said plunger having a tapered end portion complimentary to the tapered end of said valve body;
        resilient means for biasing said plunger towards the tapered end of said valve body;
        an electromagnet for biasing said plunger away from the tapered end of said valve body so as to control fuel flow through said valve body from said input port to said output port; and
    control means for supplying direct current pulses to said electromagnetic biasing means, said pulses being of variable duration but of a constant frequency substantially higher than the natural frequency of said plunger under the bias of said biasing means.

2. The fuel control system according to claim 1 including sealing means disposed between the tapered interior surface of said valve body and the radially tapered end portion of said plunger, said sealing means comprising an O-ring seated in an annular groove in the tapered portion of said valve body.

3. The fuel control system according to claim 1 wherein said control means comprises
    a speed transducer on said engine generating an output proportional to the rotational speed thereof;
    a microprocessor, in communication with said speed transducer, for generating fuel flow commands responsive to said output of said speed transducer; and
    means for generating said signal pulses from said fuel flow commands.

4. The fuel control system according to claim 3 wherein said control means further comprises
    a fiber optic cable;
    first means for encoding and transmitting said fuel flow commands along said fiber optic cable;
    first means for detecting and decoding said encoded fuel flow commands for use in generating said signal pulses;
    second means for encoding and transmitting said speed transducer output along said fiber optic cable; and
    second means for detecting and decoding said encoded output of said speed transducer transmitted along for use by said microprocessor.

* * * * *